(12) United States Patent
Jan

(10) Patent No.: US 8,100,424 B2
(45) Date of Patent: Jan. 24, 2012

(54) BICYCLE DRIVING ASSISTANCE DEVICE

(75) Inventor: Fu-She Jan, Changhua (TW)

(73) Assignee: Chienkuo Technology University, Changhua (TW)

( * ) Notice: Subject to any disclaimer, the term of this patent is extended or adjusted under 35 U.S.C. 154(b) by 254 days.

(21) Appl. No.: 12/619,719

(22) Filed: Nov. 17, 2009

(65) Prior Publication Data

US 2011/0115188 A1    May 19, 2011

(51) Int. Cl.
 *B62M 6/10* (2010.01)
 *B62M 6/20* (2010.01)
 *B62M 6/55* (2010.01)
(52) U.S. Cl. ............... 280/212; 280/215; 180/205.4; 180/206.4
(58) Field of Classification Search ............ 280/212, 280/214, 215; 180/205.1, 205.2, 205.4, 205.6, 180/206.1, 206.4; 185/39; 440/12.62
See application file for complete search history.

(56) References Cited

U.S. PATENT DOCUMENTS

| 2,277,391 | A | * | 3/1942 | Crumble | 280/215 |
| 2,638,359 | A | * | 5/1953 | Crumble | 280/215 |
| 2,908,356 | A | * | 10/1959 | Daarud | 185/39 |
| 2,965,393 | A | * | 12/1960 | Philippe | 280/212 |
| 3,894,615 | A | * | 7/1975 | Lew | 185/39 |
| 3,941,075 | A | * | 3/1976 | Rupenian | 440/12.62 |
| 4,416,464 | A | * | 11/1983 | Mattox | 280/215 |
| 5,188,003 | A | * | 2/1993 | Trammell, Jr. | 74/594.3 |
| 6,019,385 | A | * | 2/2000 | Kelley et al. | 280/217 |
| 6,053,830 | A | * | 4/2000 | Glaeser | 474/101 |
| 6,092,821 | A | * | 7/2000 | Li | 280/212 |
| 6,126,185 | A | * | 10/2000 | Kelley et al. | 280/217 |
| 7,673,893 | B2 | * | 3/2010 | Jan et al. | 280/215 |

FOREIGN PATENT DOCUMENTS

| JP | 03132493 | A | * | 6/1991 |
| JP | 04108089 | A | * | 4/1992 |

* cited by examiner

*Primary Examiner* — Joanne Silbermann
*Assistant Examiner* — Daniel Yeagley

(57) ABSTRACT

A bicycle driving assistance device includes a crank having two pedals and a first chainwheel unit is connected to the crank and a gear box which has its input shaft connected to a first chainwheel unit. A one-direction bearing is connected to the input shaft so as to rotate in the direction to store energy. A vortex spring is connected between the input shaft and the case to which a first gear of the gear box is connected. An output shaft of the gear box outputs the energy to the rear chainwheel unit via the second chainwheel unit to move the rear wheel of the bicycle. The rear chainwheel unit and the crank are separated by a one-direction bearing. When the force applied to the pedals is less than the energy stored in the vortex spring, the energy is released to assist the rider to move the bicycle.

2 Claims, 5 Drawing Sheets

BICYCLE DRIVING ASSISTANCE DEVICE

FIELD OF THE INVENTION

The present invention relates to a driving assistance device, and more particularly, to an exterior driving assistance device for bicycles and which stores energy by a vortex spring and releases the energy when needed.

BACKGROUND OF THE INVENTION

A conventional bicycle is operated by treading the pedals connected to two ends of the crank and a chain transmits the power from the chainwheel connected with the crank to the sprockets connected to the axle of the rear wheel to move the bicycle forward.

The conventional bicycle can only be operated manually and a derailleur system can be added to the bicycle to increase the efficiency of operation. For the force that the rider applied to the bicycle, once the force is discontinued, there is no assistance device to adjust, store or change the force.

SUMMARY OF THE INVENTION

The present invention relates to a bicycle driving assistance device and comprises a crank having two pedals connected to two ends thereof and a first chainwheel unit has a first chainwheel thereof connected to the crank on a first side of a bicycle. A gear box has an input shaft, an output shaft, a vortex spring, a case, a first gear, an idle gear and a second gear, wherein the input shaft is connected to a second chainwheel of the first chainwheel unit. A first chain is engaged between the first and second chainwheels. A free end of the input shaft is connected with a first one-direction bearing so that the input shaft is restricted to rotate in a pre-set direction. The vortex spring, the case and the first gear are respectively mounted to the input shaft. A first end of the vortex spring is fixed to the input shaft and a second end of the vortex spring is fixed to the case. The case is fixed to the first gear which is engaged with the idle gear, and the idle gear is engaged with the second gear which is connected to the output shaft. A second chainwheel unit has an output chainwheel which is fixed to the output shaft on a second side of the bicycle. A third chainwheel of the second chainwheel unit is connected to a fourth chainwheel of a rear chainwheel unit. A second chain is engaged between the third chainwheel and the output chainwheel. The fourth chainwheel is connected to the crank by a second one-direction bearing. A third chain is engaged between a rear chainwheel of the rear chainwheel unit and the fourth chainwheel. An energy stored in the vortex spring is released when the force applied to the pedals is less than the energy stored in the vortex spring.

The primary object of the present invention is to provide a bicycle driving assistance device which applies an extra force to move the bicycle when the force applied to the pedals is less than the energy stored in the vortex spring. The revolution ratio of the output chainwheel of bicycle driving assistance device to the input speed by the rider is 1.05 so that there will be 5% of energy is stored during treading the pedals and the stored energy can be released when needed.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
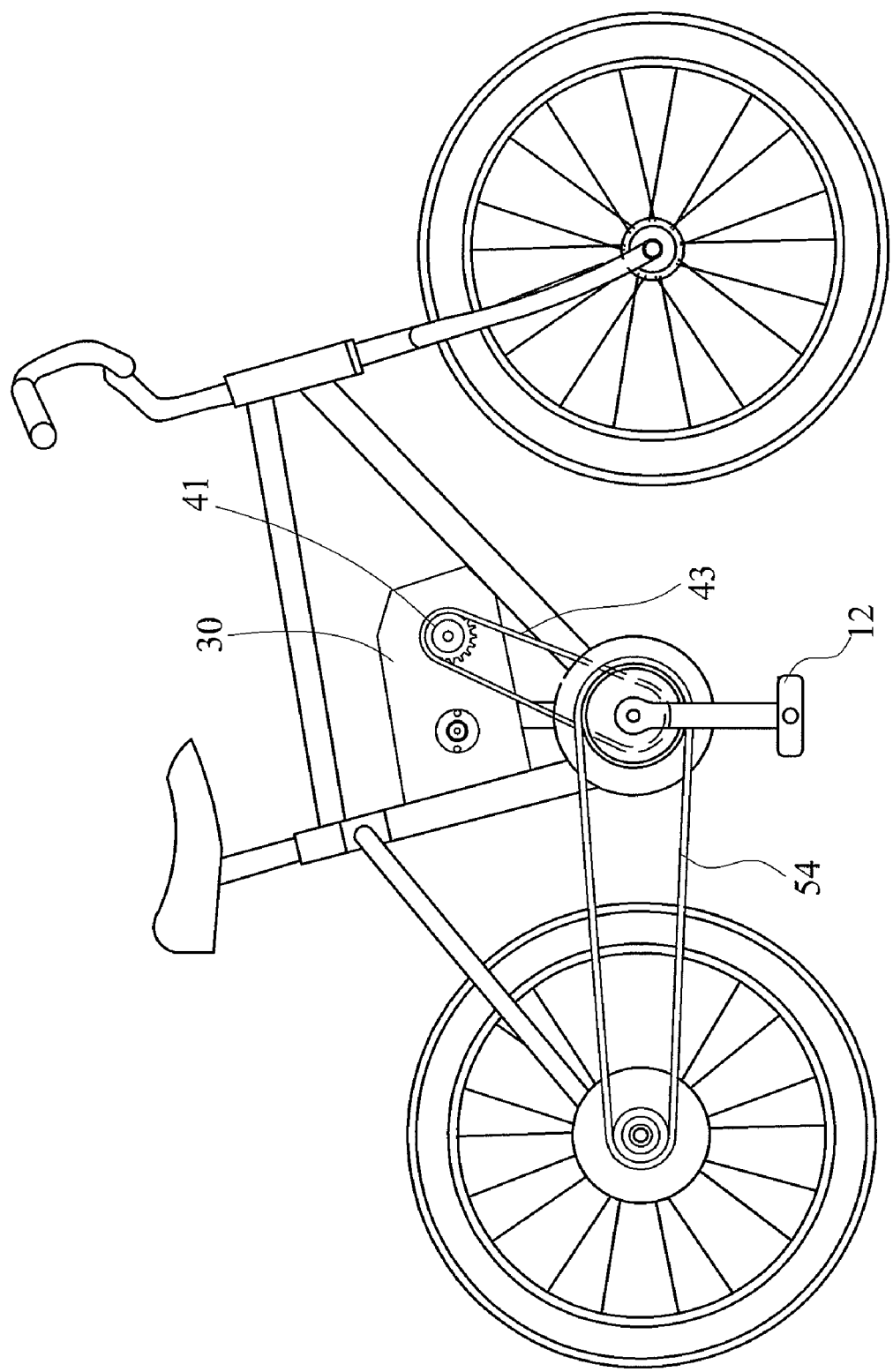
FIG. 1 is a side view to show the driving assistance device of the present invention connected on a bicycle.
Figure 2:
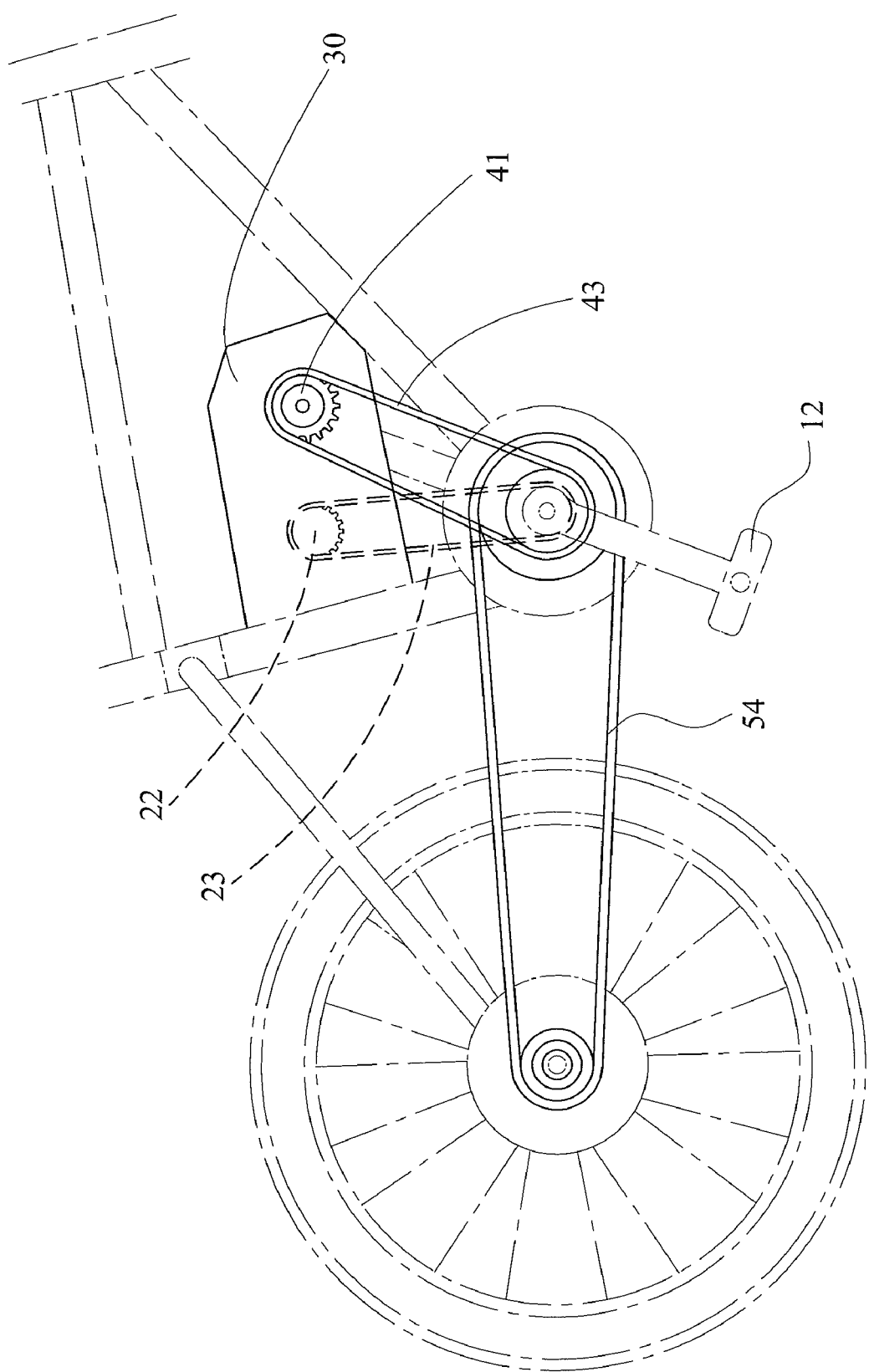
FIG. 2 shows the second chainwheel and the output chainwheel on two sides of the gear box of the driving assistance device of the present invention.
Figure 3:
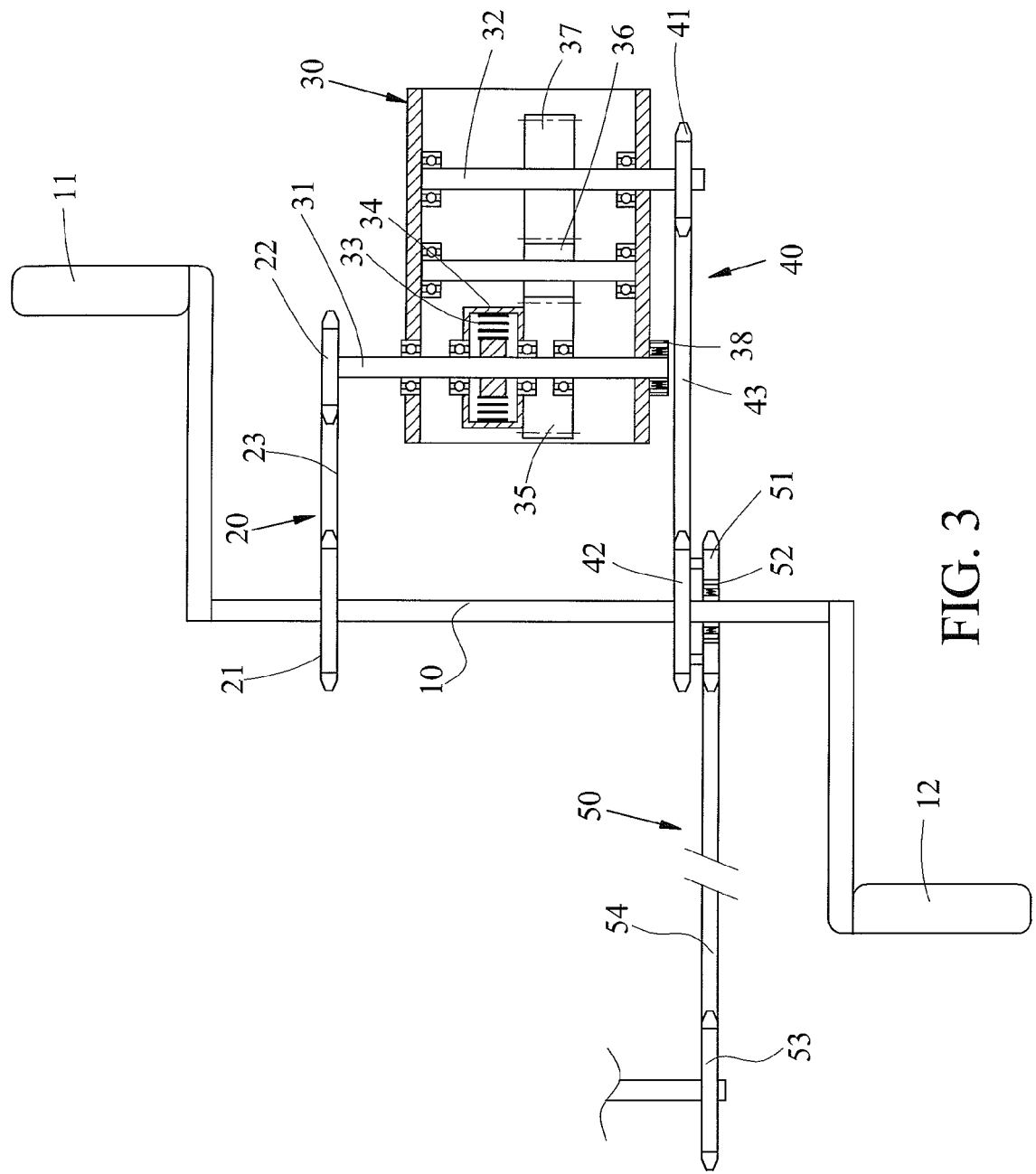
FIG. 3 shows the driving assistance device of the present invention.
Figure 4:
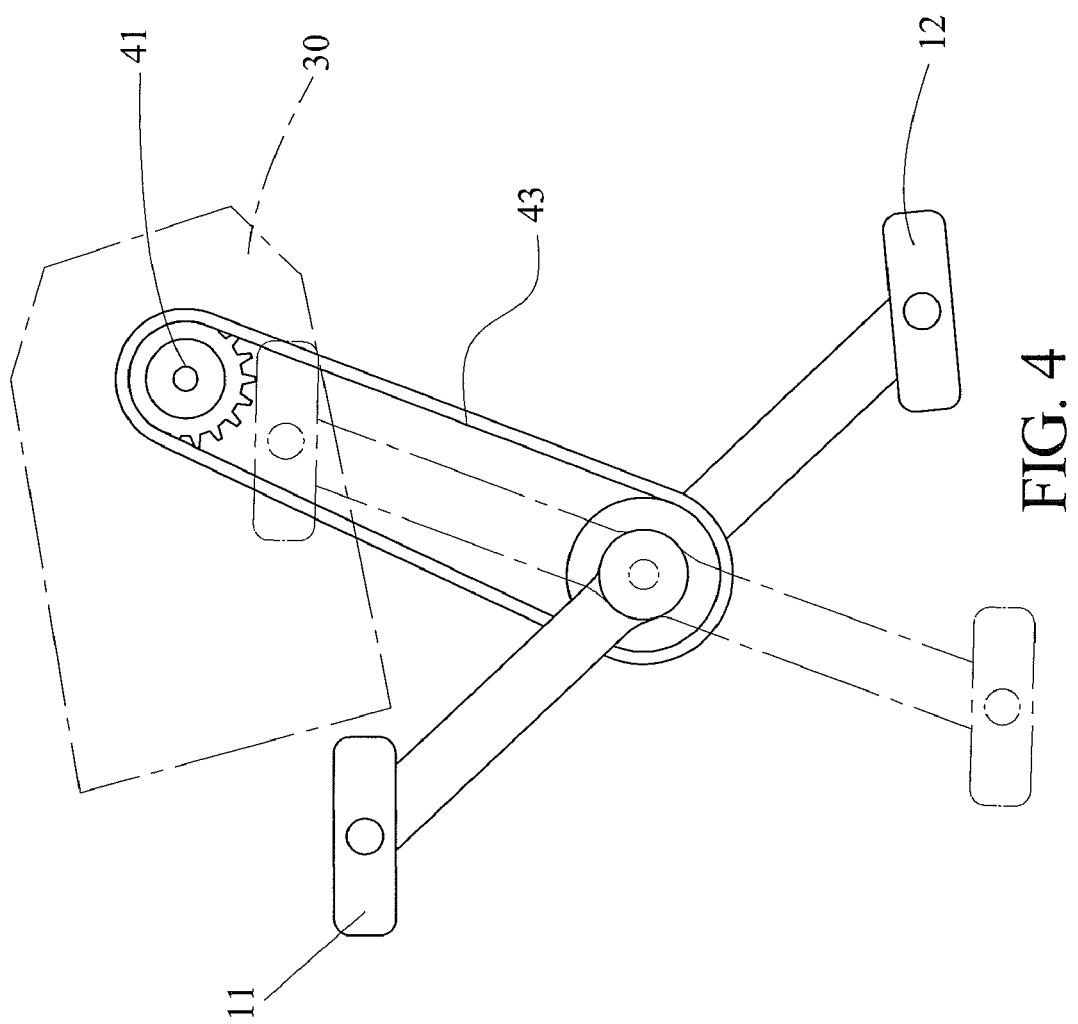
FIG. 4 shows that the pedals are treaded and the second chain drives the output chainwheel.
Figure 5:
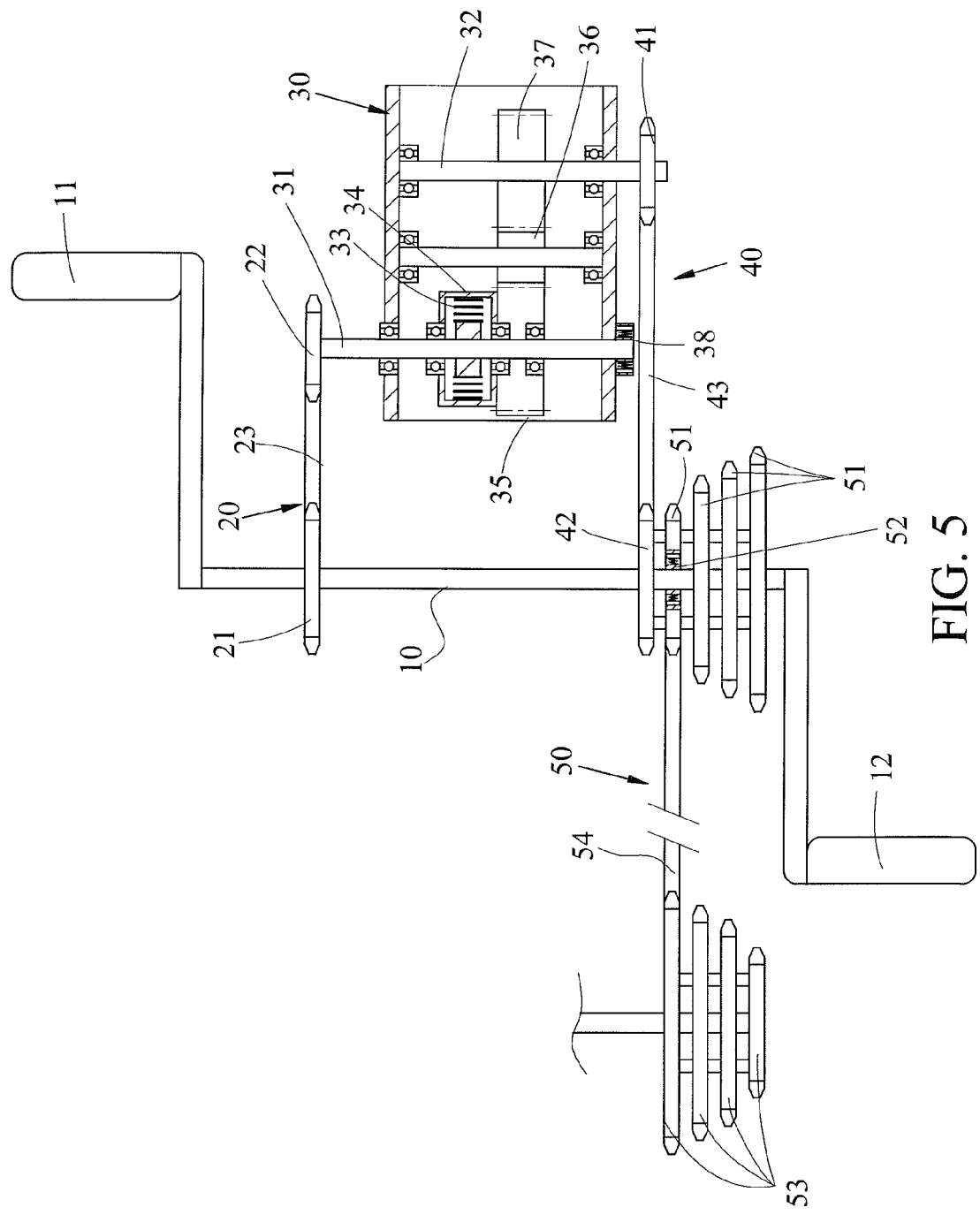
FIG. 5 shows another embodiment of the driving assistance device of the present invention.

Referring to FIGS. 1 to 5, the bicycle driving device of the present invention comprises a crank 10 having two pedals 11, 12 connected to two ends thereof and a first chainwheel unit 20 which has a first chainwheel 21 connected to the crank 10 on the first side of a bicycle.

A gear box 30 is connected to the bicycle frame and includes an input shaft 31, an output shaft 32, a vortex spring 33, a case 34, a first gear 35, an idle gear 36 and a second gear 37. The input shaft 31 is connected to a second chainwheel 22 of the first chainwheel unit 20 and a first chain 23 is engaged between the first and second chainwheels 21, 22. A free end of the input shaft 31 is connected with a first one-direction bearing 38 so that the input shaft 31 is restricted to rotate in a pre-set direction. The vortex spring 33, the case 34 and the first gear 35 are respectively mounted to the input shaft 31. A first end of the vortex spring 33 is fixed to the input shaft 31 and a second end of the vortex spring 33 is fixed to the case 34. The case 34 is fixed to the first gear 35 which is engaged with the idle gear 36, and the idle gear 36 is engaged with the second gear 22 which is connected to the output shaft 32.

A second chainwheel unit 40 has an output chainwheel 41 which is fixed to the output shaft 32 on the second side of the bicycle.

A third chainwheel 42 of the second chainwheel unit 40 is connected to a fourth chainwheel 51 of a rear chainwheel unit 50, and a second chain 43 is engaged between the third chainwheel 42 and the output chainwheel 41. The fourth chainwheel 51 is connected to the crank 10 by a second one-direction bearing 52. A third chain 54 is engaged between a rear chainwheel 53 of the rear chainwheel unit 50 and the fourth chainwheel 51.

The present invention is composed of the gear box 30 which includes the vortex spring 33, a first chainwheel unit 20 and the second chainwheel unit 40. When the rider treads the pedals 11, 12 forward, the rear chainwheel unit 50 on the second side of the bicycle drives the rear chainwheel 53, and the first chainwheel unit 20 on the first side of the bicycle rotates the output chainwheel 41 via the vortex spring 33, the first gear 35, the idle gear 36 and the second gear 37. The speed of revolution of the output chainwheel 41 is 1.05 times to the input speed of revolution, so that there will be 5% of the energy is stored in the vortex spring 33. When the bicycle is ridden along a road of upward slope, if the force applied to the pedals 11, 12 is larger than the load, the energy is stored, and if the force applied to the pedals 11, 12 is smaller than the load, the energy stored in the vortex spring 33 is released. In other words, when the rider does not rotate the crank, the energy of the vortex spring 33 is released to assist the rider to move the bicycle. The energy allows the rider to climb 5 degrees of upward slope.

It is noted that when the force applied to the pedals 11, 12 is less than the energy stored in the vortex spring 33, the energy is released while the crank 10 is not rotated, so that the user can apply an immediate force to the pedals 11, 12. whenever the rider applies the force to the pedals 11, 12.

The input shaft 31, the output shaft 32 and the crank 10 are supported by two bears which make the shafts 31, 32, 10 to rotate smoothly.

The present invention can also be applied to the bicycle with derailleur system, wherein the fourth chainwheel 51 includes multiple sprockets of different number of teeth and the sprockets are integrally made as a one-piece, and the rear chainwheel 53 includes multiple sprockets of different number of teeth and the sprockets are integrally made as a one-piece.

While we have shown and described the embodiment in accordance with the present invention, it should be clear to those skilled in the art that further embodiments may be made without departing from the scope of the present invention.

What is claimed is:

1. A bicycle driving assistance device comprising:
   a crank having two pedals connected to two ends thereof;
   a first chainwheel unit having a first chainwheel connected to the crank on a first side of a bicycle;
   a gear box having an input shaft, an output shaft, a vortex spring, a case, a first gear, an idle gear and a second gear, the input shaft connected to a second chainwheel of the first chainwheel unit, a first chain engaged between the first and second chainwheels, a free end of the input shaft connected with a first one-direction bearing so that the input shaft is restrict to rotate in a pre-set direction, the vortex spring, the case, the first gear respectively mounted to the input shaft, a first end of the vortex spring fixed to the input shaft and a second end of the vortex spring fixed to the case, the case fixed to the first gear which is engaged with the idle gear, the idle gear engaged with the second gear which is connected to the output shaft;
   a second chainwheel unit having an output chainwheel which is fixed to the output shaft on a second side of the bicycle, and
   a third chainwheel of the second chainwheel unit connected to a fourth chainwheel of a rear chainwheel unit, a second chain engaged between the third chainwheel and the output chainwheel, the fourth chainwheel connected to the crank by a second one-direction bearing, a third chain engaged between a rear chainwheel of the rear chainwheel unit and the fourth chainwheel, an energy stored in the vortex spring being released when the force applied to the pedals is less than the energy stored in the vortex spring.

2. The device as claimed in claim 1, wherein the fourth chainwheel includes multiple sprockets of different number of teeth and the sprockets are integrally made as a one-piece, the rear chainwheel includes multiple sprockets of different number of teeth and the sprockets are integrally made as a one-piece.

* * * * *